United States Patent [19]

Hemmady et al.

[11] Patent Number: 5,438,565

[45] Date of Patent: * Aug. 1, 1995

[54] PACKET SWITCH TO PROVIDE CODE DIVISION, MULTIPLE ACCESS CELLULAR SERVICE

[75] Inventors: Jayant G. Hemmady, Naperville; Craig P. Reilly, Carol Stream; Neil J. Romy, Lisle; Ronald A. Spanke, Wheaton; Douglas H. Yano, Naperville, all of Ill.

[73] Assignee: AT&T Corp., Murray Hill, N.J.

[*] Notice: The portion of the term of this patent subsequent to Mar. 16, 2010 has been disclaimed.

[21] Appl. No.: 40,819

[22] Filed: Mar. 31, 1993

[51] Int. Cl.⁶ .................................... H04L 12/64
[52] U.S. Cl. .................................... 370/60; 370/18; 370/85.13; 370/94.1; 379/59; 379/60; 455/33.1; 455/33.2
[58] Field of Search ............... 370/79, 18, 85.13, 85, 370/14, 60, 94.1; 379/59, 60; 455/33.1, 33.2

[56] References Cited

U.S. PATENT DOCUMENTS

| | | | |
|---|---|---|---|
| 4,726,014 | 2/1988 | Goldman et al. | 370/58 |
| 4,901,307 | 2/1990 | Gilhousen et al. | 370/18 |
| 4,912,701 | 3/1990 | Nicholas | 370/60 |
| 4,926,421 | 5/1990 | Kawano et al. | 370/95.1 |
| 5,101,501 | 3/1992 | Gilhousen et al. | 455/33.2 |
| 5,134,645 | 7/1992 | Berken et al. | 379/58 |
| 5,195,090 | 3/1993 | Bolliger et al. | 370/94.1 |

*Primary Examiner*—Douglas W. Olms
*Assistant Examiner*—Russell W. Blum
*Attorney, Agent, or Firm*—Michael B. Johannesen

[57] ABSTRACT

A system for relaying CDMA packetized data from a cell site or sites to a destination speech processor. The CDMA packetized data, is received at the cell site and is sent in its packetized form along with a destination address to a packet switch. A packet handler at the packet switch receives the CDMA data packets and forwards them on a packet bus. If the destination speech processor assigned to that call is connected to the packet bus, it recognizes its own address and processes the data packet.

8 Claims, 6 Drawing Sheets

PACKET SWITCH TO PROVIDE CODE DIVISION, MULTIPLE ACCESS CELLULAR SERVICE

CROSS-REFERENCE TO RELATED APPLICATION

This application is related to U.S. patent application Ser. No. 08/040,818, entitled "System for Inter Packet Community Communication," filed concurrently with this application.

1. Technical Field

This invention relates to the field of packet switching, and more specifically, to providing connectionless code division, multiple access cellular service between a cell site and a switch through a packet switch.

2. Background of the Invention

Code division, multiple access (CDMA) cellular communications provides ten to twenty times the call-handling capacity of analog cellular communication systems. See e.g., "An Overview of the Application of Code Division Multiple Access (CDMA) to Digital Cellular Systems and Personal Cellular Networks," May 21, 1992, available from QUALCOMM, Inc., 10555 Sorrento Valley Road-San Diego, Calif. A CDMA system transmits/receives voice or data at the relatively slow rate of approximately 8K bps from a mobile unit over a spread spectrum signal to a cell site. A transceiver at a cell site sends/receives the spread spectrum signal and translates it into packets. A speech processor then translates the packets into a digital 64K bps pulse code modulated (PCM) stream, as used in standard digital switching. (CDMA cellular communications is more fully described in QUALCOMM, Inc., "The Wideband Spread Spectrum Digital Cellular System Dual-Mode Mobile Station-Base Station Compatibility Standard" and QUALCOMM, Inc., "CDMA Digital Common Air Interface Standard," Revision 1.0, October, 1990.) In most CDMA system designs, the speech processor is at the cell site. A circuit switched connection is then made from the cell site through the serving switch and into the public switched telephone network (PSTN).

A problem associated with this system (and common to all cellular systems with circuit switched connections between the cell site and the switch) is that, as the mobile moves from cell to cell, the circuit connection between the cell site and the switch must be torn down and re-established to the new cell site. Tearing down and re-establishing a circuit connection as a mobile moves from cell to cell and from switch to switch is known in the art as a "hard handoff." Hard handoffs are perceivable by the user as noticeable clicks and/or pauses in service. It is desirable in the art to provide "soft handoffs," or handoffs from cell to cell and from switch to switch that are not perceptible to the user.

One solution to the problem of hard handoff is found in U.S. Pat. No. 5,184,347, which issued to AT&T in the name of Farwell et al. (herein "Farwell"). Farwell provides a system that delivers CDMA packets from a cell site to speech processor. Each cell site is connected to a cell interconnect module which consists of a DS1 interface unit a local area network bus and a packet processing network. Packets originate in the cell site addressed for the packet processing network are transmitted over a DS1 link to the DS1 interface unit. The DS1 interface unit delivers the packets to the local area network bus, which is connected to a packet processing element. The packet processing element includes a table for translating the packet processing element address into a speech processor address. The packet is then sent to a fiber optic interface and over the fiber optic connect to an expansion interface. The expansion interface places the packet on another local area network. The packet is then picked up by a speech processing unit.

Soft handoffs are initiated in the system of the Farwell patent by the mobile determining that it is in range of a second cell site. A handoff request message is sent to the mobile switching complex, designating the second cell site as the new cell site. A new path is then set up through the switch complex to the speech processor by first selecting a route from the new cell site to the existing speech processor, and then informing each element along the route of the new connection. Each element then populates its look-up table with the appropriate call data to route the call to the next element and eventually to the speech processor. The speech processor then receives two packets containing nearly identical data, and selects the one with a stronger signal strength. Thus, the same speech processor is used for both cells, and a hard handoff is avoided. This system is complex in hardware and requires some time to establish and tear down each path through the system. Additionally, several look-ups are performed during the routing of each packet.

Therefore, a problem in the art is that there is no simple and fast connectionless cell-to-switch communication that provides soft handoffs.

SUMMARY OF THE INVENTION

This problem is solved and a technical advance is achieved in the art by a system and method for relaying packets to and from a cell site receiver to and from a destination PSTN interface via a self-routing packet-switched mechanism. Packets from the cell site include a unique routing address of a destination PSTN interface (speech processor). The packets are constructed by the receiver at the cell site and sent in a packet pipe to a packet switch in a host switching system. A packet handler at the packet switch receives the packets, demultiplexes the packet pipe and forwards the packets on a packet bus. The destination PSTN interface assigned to that call recognizes its own address in the packet on the packet bus and processes the packets. Packets from the PSTN interface also include a unique routing address of the packet handler communicating with the cell site. These packets are sent on the packet bus where they are recognized by the packet handler, and sent in a packet pipe to the cell site.

As the mobile moves from cell to cell, and from a cell connected to one switch to a cell connected to another switch, the new cell site is informed of the address of the destination PSTN interface originally assigned to the call, and the new cell uses its own packet pipes to send the packets to the destination PSTN interface using the same address. The destination PSTN interface, during the period when a mobile is moving from one cell to another, receives packets from both cell sites and selects the best quality packet. Thus, continuity of the connection is guaranteed as the mobile moves from cell to cell. Since there is no circuit connection, the mobile may traverse the entire cellular system served by the switch without a perceptible "hard" handoff.

BRIEF DESCRIPTION OF THE DRAWING

A more complete understanding of the invention may be obtained from consideration of the following description in conjunction with the drawings in which.

DETAILED DESCRIPTION

Figure 1:
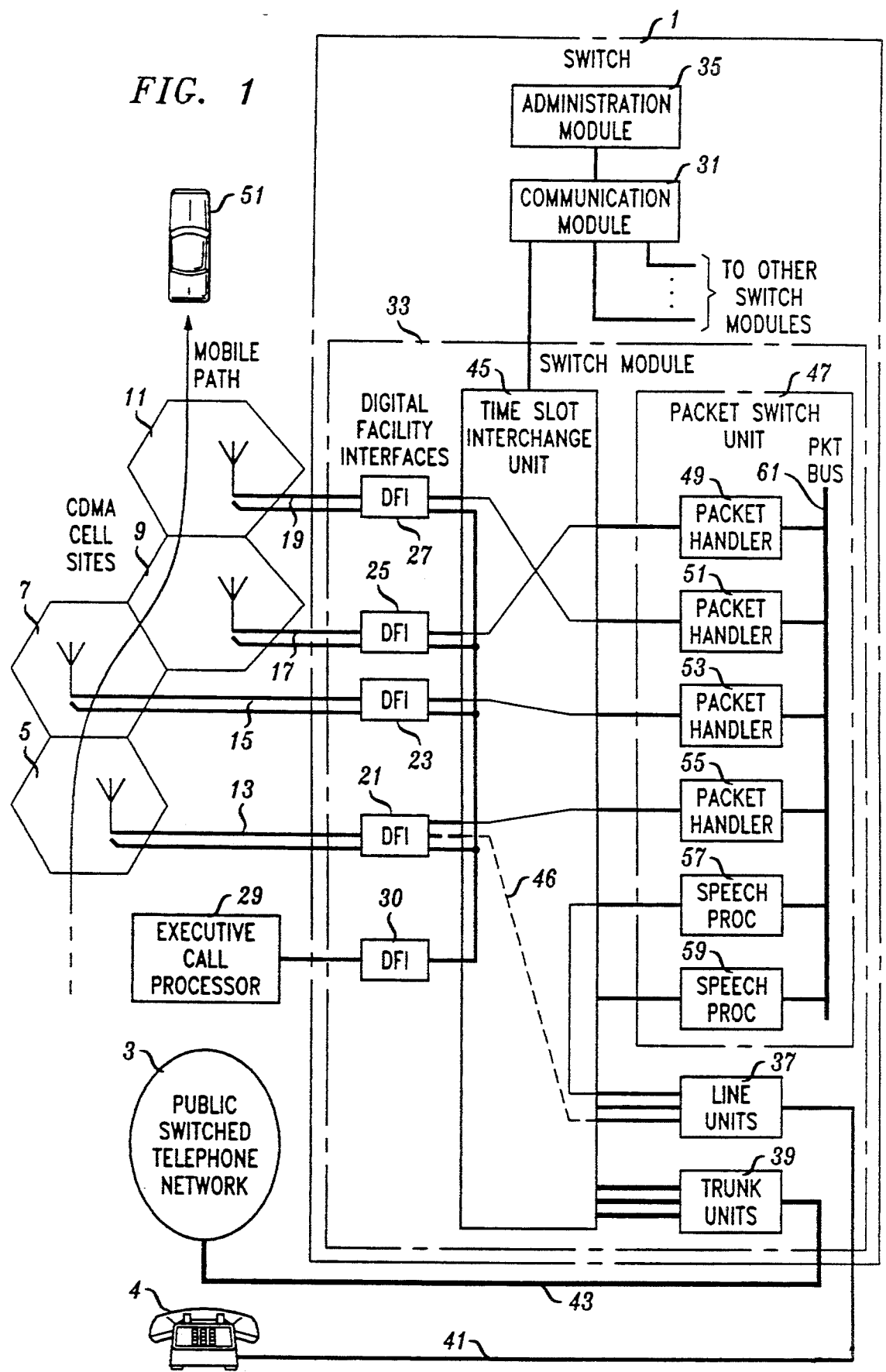
FIG. 1 is a block diagram of a mobile telephone switching system showing a packet switch distributing CDMA packets to speech processors according to an exemplary embodiment of this invention.

An exemplary embodiment of a self-routing mechanism to deliver packets between a cell site and a public switch telephone network interface is described here in the context of a mobile telephone switching system, as illustrated in FIG. 1, having a central office switch 1, which is connected to a public switched telephone network 3, a telephone 4, and a plurality of CDMA cell sites 5–11. CDMA cell sites 5–11 send and receive spread spectrum signals and translate these signals to/from a packetized stream. CDMA cell sites 5–11 are connected to switch 1 via a plurality of trunks 13–19, connected to an equal number of digital facility interfaces (DFI) 21–27 at switch module (SM) 33 of switch 1. DFIs 21–27 provide termination of the digital trunks to and from cell sites 5–11, as is ;known in the art, and therefore, will not be discussed further. Executive Call Processor (ECP) network 29 connects to switch 1 and cell site 5–11 for exchange of control data via DFI 30, as is known in the art, and described in the Bell System Technical Journal, Vol. 58, No. 1, January, 1979.

Switch 1 is, illustratively, a distributed control, ISDN electronic telephone system, such as the system disclosed in U.S. Pat. No. 4,592,048, issued to M. W. Beckner, et al., on May 27, 1986. Alternatively, switch 1 may be a distributed control digital switch such as a 5ESS ® switch manufactured by AT&T and described in the AT&T Technical Journal, Vol. 64, No. 6, July/August, 1985, pages 1303-1564. The architecture of switch 1 includes communication module 31 as a hub, with switching module 33, other switching modules (not shown for clarity) and administrative module 35 emanating therefrom. Switching module 33 terminates analog and/or digital subscriber lines through line units, such as line unit 37, and analog or digital trunks through trunk units, such as trunk unit 39. Line unit 37 provides communication with telephone 4 via line 41. Trunk unit 39 provides communication with public switch telephone network 3 via trunks 43. Administrative module 35 provides coordination of the functional components of switch 1 and human/machine interface.

Switch module 33 includes a timeslot interchange unit (TSIU) 45 and packet switch unit 47. TSIU 45 provides interchange of 64K bps PCM or 64K bps clear channel among the units in switch module 33. Switch module 33 may also contain other units but, for purpose of clarity, these other units are not shown.

Packet switch unit (PSU) 47, according to an exemplary embodiment of this invention, includes packet handlers 49–55 and speech processors 57 and 59, which are all connected to packet bus 61. Packet handlers 49–55 and speech processors 57 and 59 are known in the art as "endpoints." Other endpoints performing similar (or dissimilar) functions may also, be connected to packet bus 61, but are not shown for clarity. PSU 47 makes up a packet switch community, that is, a packet bus and its associated endpoints. Packet handlers 49–55 perform a frame relay function: receiving packets from cell sites, adding a two-part address, and relaying the packets onto a means for transporting packets, which in this exemplary embodiment is packet bus 61, as will be explained further, below. Speech processors 57 and 59 determine which packets include a two-part address that describes themselves (as will be defined below), receive them, and translate the packets into switchable 64K bps PCM. In the reverse direction, speech processors 57 and 59 receive 64K bps PCM, translate it into packets, add a two-part address, and send the packets out onto a bus 61.

In the prior art, a CDMA call between a mobile telephone, for example, in car 54, and telephone 4 (or PSTN 3), originates in, for example, cell 5. The speech from the mobile user is encoded using CDMA technology at mobile 51 and transmitted to cell site 5 over the spread spectrum. According to the teaching of the prior art, a CDMA speech processor located at cell site 5 translates from CDMA into the 64K bps PCM stream switchable by switch module 33. A circuit switched path connection through DFI 21 to TSIU 45, as represented by broken line 46, is established that interconnects the translated speech signal with line unit 37, for example, and to telephone 4. As mobile 51 moves from cell 5 into cell 7, another speech processor at cell 7 performs the translation and TSIU path 46 must be torn down and then set up to DFI 23. As mobile 54 continues through cell sites 9 and 11, further rearrangements of TSIU 43 paths are necessary.

According to the exemplary embodiment of this invention, mobile telephone 54 initiates a CDMA call in cell 5. In this exemplary embodiment, there is no speech processor in cell 5; instead, there are one or more (2 in this example) speech processors 57, 59, connected to packet bus 61 in packet switch unit 47. The CDMA call is set up between mobile 54 and cell site 5, as before. A speech processor 57, in this example, at switch 1 is assigned to the call and the unique two-part address is given to cell site 5 that describes speech processor 57, as will be described below, in connection with FIG. 3.

As signals arrive at cell site 5, they are packetized and the unique two-part address is added to it. The packets are multiplexed into packet pipes, which are themselves multiplexed and sent over facility 13. DFI 21 receives the multiplexed trunk, demultiplexes the packet pipes and sends the packet pipes to packet handler 55 on a path through TSIU 45 that is semi-permanently set up ("nailed up") between DFI 21 and packet handler 55. As packets come in through TSIU 45 to packet handler 55, packets are demultiplexed from the packet pipes and placed on packet bus 61. Packets are then received by speech processor 57. Speech processor 57 accepts ("picks") all packets where the two-part address includes its packet community and unit number, and performs the conversion to 64K bps PCM. Speech processor 57 is connected through TSIU 45 to line unit 37 and to telephone 4 (alternatively through trunk unit 39 to PSTN 3).

Speech (or data) from telephone 4 (PSTN 3) to mobile 54 moves through line unit 37 (trunk unit 39), where it is carried as 64K bps streams and sent through TSIU 45 and into speech processor 57. Speech processor 57 keeps a record of which cell site is the source of incoming packets, including a unique two-part address of packet handler 55 associated with cell site 5, which is in communication with destination mobile 54, and uses that source address as the destination two-part address for the outgoing packets. Speech processor 57 translates the 64K bps packets into packets, adds the destination two-part address of packet handler 55 and sends them on packet bus 61. Packet handler 55 recognizes its own address in the packets on packet bus 61, multiplexes the packets in packet pipes and sends them through TSIU 45 to DFI 21. DFI 21 multiplexes a plurality of packet pipes, and sends them to cell site 5 via facility 13. Cell site 5 demultiplexes the stream on the facility and then demultiplexes the packet pipes, and transmits a CDMA spread spectrum signal to mobile 54.

As mobile 54 approaches the boundary between two cells, for example cells 5 and 7, mobile 54 in conjunction with cell 5 determine that the call needs to be handed off to cell 7, according to CDMA protocol. Cell 7 is informed of the two-part address of the speech processor associated with the call, in this example, speech processor 57. Cell 7 then receives a digital signal from mobile 54 and also begins to send packets to speech processor 57 through DFI 23, via a nailed-up connection through TSI 45 to packet handler 55, which places these packets on packet bus 61.

Speech processor 57 then receives two packets containing basically identical data from two different cells. Speech processor 57 compares signal strength, as encoded into each packet via the CDMA process, processes the packet with the stronger signal strength, and ignores the other packet. As stated above, speech processor 57 records the two-part address of the packet handler connected to the cell or cells that are sending packets and, therefore, it sends identical packets in return to all of the cells transmitting to it.

Ultimately, the signal strength at cell site 5 will fall below a threshold, and speech processor 57 will receive packets with a very low signal strength from cell 5. Cell 5 is then requested to remove itself from the call. Cell 5 informs speech processor 57 that it is removing itself from the call, and speech processor 57 removes the address of packet handler 55 of cell site 5 from its list. During the time that these events are occurring between the cell sites and the speech processor, only one connection is established between a cell site and its associated packet handler, and only one connection is established from speech processor 57 through to telephone 4 (or public switch telephone network 3), and no hard handoff occurs as mobile 51 moves through the CDMA cell sites.

Figure 2:
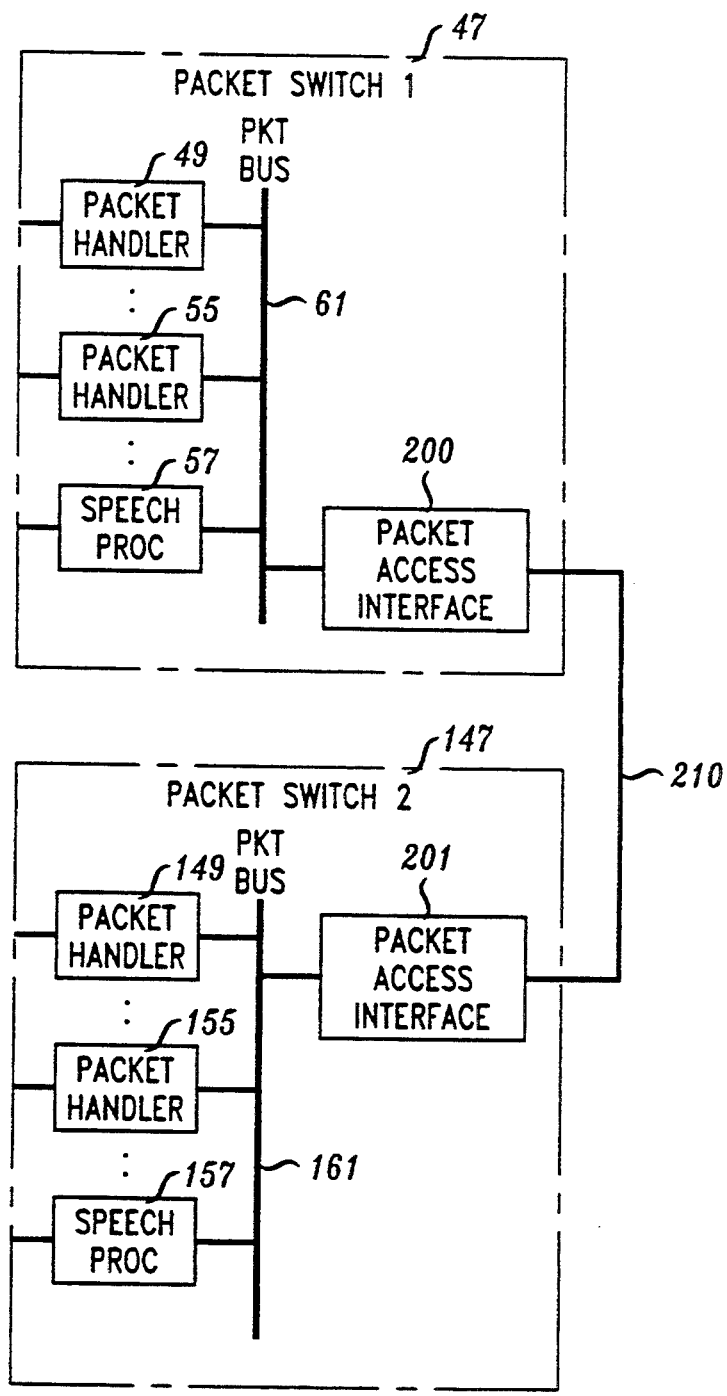
FIG. 2 is a block diagram of two packet switches distributing CDMA packets according to one aspect of this invention, where the packet switches are directly connected to each other by packet access interfaces connected by an asynchronous transfer mode (ATM) link.

FIG. 2 extends the network of FIG. 1 according to a further aspect of this invention. Packet switch unit 47 in switch 1 may be in another switch module in the same switch. Alternatively, packet switch unit 147 may be connected to other packet switch units, for example, packet switch unit 147 in another switch. This extends the range of the mobile network by permitting packet handlers, for example 149 and 155 in packet switch 147, to communicate with speech processor 57 in packet switch 47 (in SM 33 of original switch 1) via a packet transport network.

Inter-packet switch communication is facilitated via packet access interfaces 200, 201, using an address community-match system. Packet access interface (PAI) 201 examines all packets from packet bus 161, determines that the packets are addressed for an external destination (such as speech processor 57 on packet bus 61), by examining the first field of the destination address and concluding that the community address matches the packet switch community number of packet switch 47 to which it is connected. PAI 201 encapsulates the packets with transport protocol data and sends it out on a transfer bus 210. In the exemplary embodiment of this invention, asynchronous transfer mode (ATM) communication is the preferred packet transport network. Other means for establishing a packet transport network, for example, ETHERNET, may be used without departing from the scope of this invention.

For this exemplary embodiment of this invention, if PAI 201 receives packets from packet bus 161 that it recognizes are addressed to a speech processor connected to packet bus 61, it stores them in an internal memory. Since packets on packet bus 161 may be of variable lengths (for example, the packet would be very short if there were silence being communicated or alternatively may be very long if data are being communicated) PAI 201 breaks the packets into a fixed length cell so that it may be encapsulated with the proper protocol for ATM and then shipped out on ATM link 210.

PAI 200 receives packets from ATM 210, strips off the encapsulation protocol data, and, if necessary, reassembles the packets into the original length. PAI 200 then places the packet on packet bus 61, speech processor 57 recognizes its own address, takes the packet off of packet bus 61 and processes it as stated above.

Figure 3:
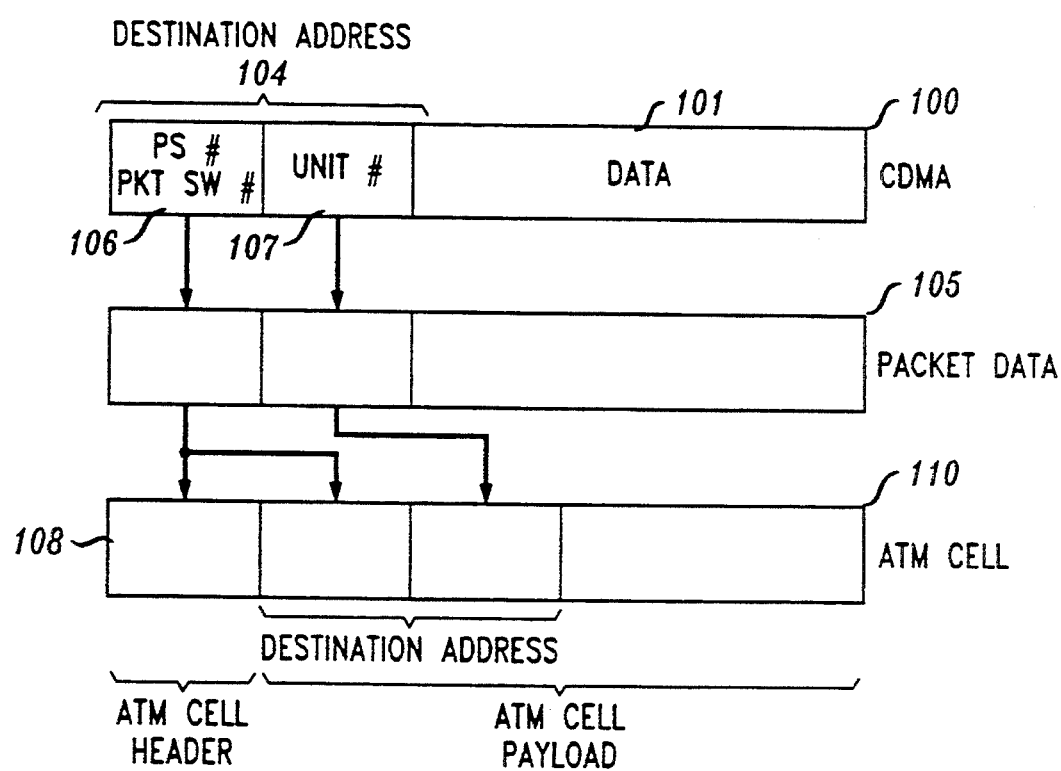
FIG. 3 is a block diagram of a packet addressing system according to one aspect of this invention.

FIG. 3 is a block diagram of a packet addressing system according to an exemplary embodiment of this invention, as applied to the embodiment of FIGS. 1 and 2. Packet 100 comprises a message as it is received at a packet handler, such as packet handler 55 from cell site 5. Packet 100 includes a data portion 101 for the CDMA encoded information, and a destination address 104. Destination address 104 comprises two fields, a destination packet switch number (also called "packet community 106"), and a unit number 106 designating an endpoint within the packet community. This address is assigned via the ECP 29 during call setup, and propagated throughout the cellular system as mobile 51 (FIG. 1) moves from cell to cell, as described above.

In the embodiment of FIG. 1, packet handler 55 adds whatever protocol is required by the packet community, if any, transforming CDMA packet 100 into packet data 105. In this example, packet switch number field 106 is the number of packet switch community 47; unit number field 107 is for the endpoint speech processor 57.

In the embodiment of FIG. 2, PAI 201 recognizes that the packet switch number field 106 of destination address 104 in packet 105 is addressed to packet switch 1. Therefore, PAI 201 removes packet 105 from packet bus 161 and encapsulates packet 105 into an ATM cell 110. This may include breaking the data 101 into multiple parts if the data portion 101 is too long for one ATM cell 110. PAI 201 then places the community address field into the VCI or VPI field of the ATM cell header 108 of ATM cell 110.

After PAI 201 delivers ATM cell 110 to PAI 200, PAI 200 removes the ATM transport layer to reassemble the data into packet 105 and sends it on bus 61. Speech processor 57 recognizes its destination endpoint number, and its packet community number, and receives packet 105. In this manner, packetized data may be sent throughout a connectionless transport system without delaying the initial packets. Furthermore, routing information does not have to be stored in every node handling the packet.

According to the teaching of the prior art, most packet bus addressing systems solely include the identification number or address of the destination endpoint. In such systems where there is no interconnection of packet switch communities, this addressing system is sufficient to uniquely identify a destination endpoint. Any other address fields are expected to be zero or null. In this embodiment of this invention, a two-part address has a first field representing the address of a destination packet switch community, so that the packet can be routed to the proper destination packet switch community. Once at the destination packet switch community, this field is not needed, and, in order to make this system transparent when used with prior art packet switches, unwanted. Therefore, the destination packet switch community address may be changed by the source PAI, the destination PAI, or the packet transport network connecting the two into a local address (usually zero or null). Advantageously, each destination endpoint recognizes both its local address and its packet switch community address along with its endpoint address. This facilitates delivery of packets when the source and destination endpoints are on the same packet switch community.

Figure 4:
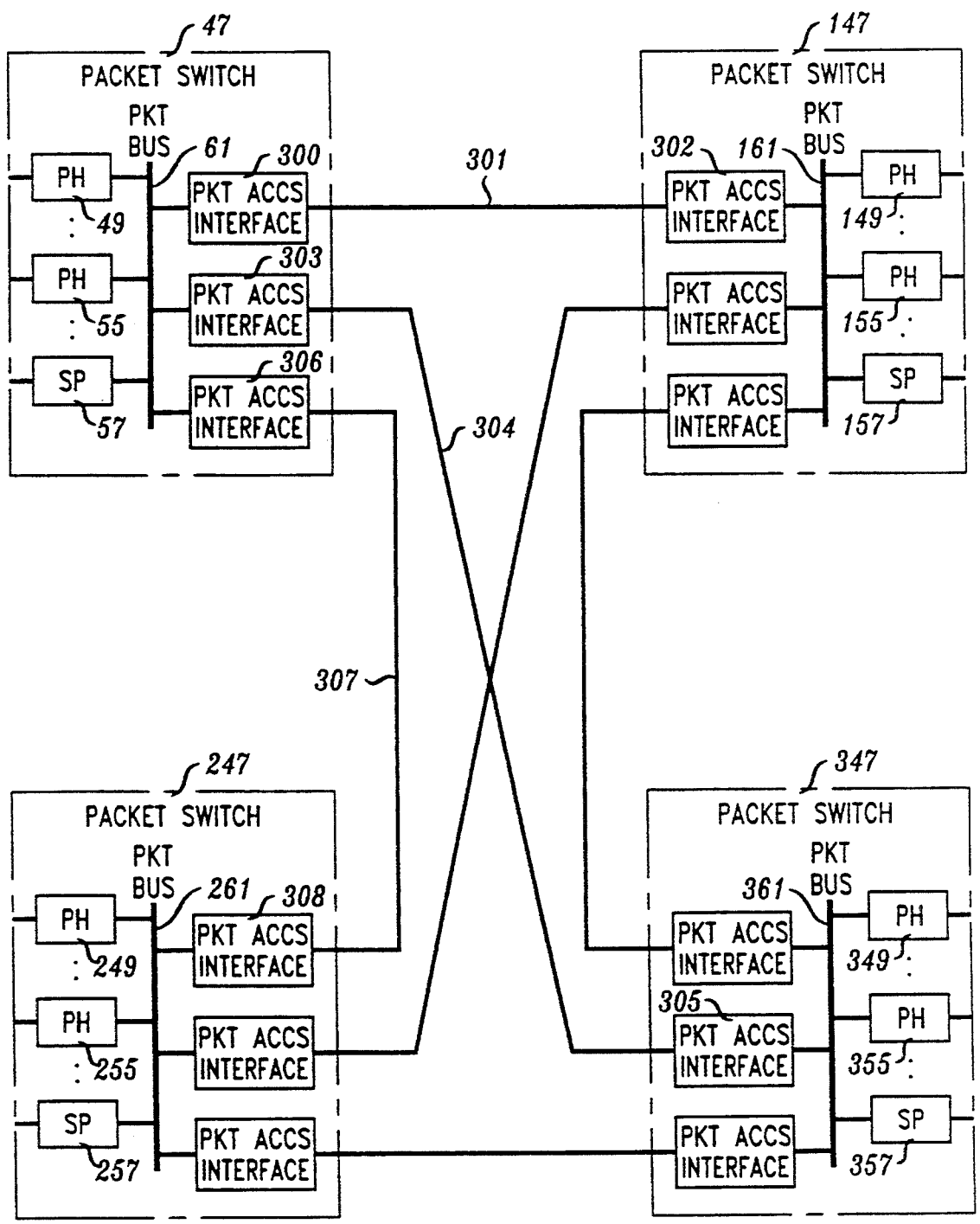
FIG. 4 is a block diagram of a plurality of packet switches fully point-to-point inter-connected by an ATM interface, according to another aspect of this invention.

A more complex interconnection of packet switches, according to another exemplary embodiment of this invention, is shown in FIG. 4. This configuration may be used to interconnect, for example, a plurality of packet switches in a plurality of different switch modules within a single switch. Also, this configuration may be used to connect switch modules of different switches. In this configuration, each packet switch is connected to all of the other packet switches via individual PAIs and ATM links. For example, packet switch 47 is connected to packet switch 147 via PAI 300, ATM link 301, and PAI 302. Likewise, packet switch 47 is connected to packet switch 347 via PAI 303, ATM link 304, and PAI 305 in packet switch 347. Finally, packet switch 47 is connected to packet switch 247 via PAI 306, ATM link 307, and PAI 308. Each packet switch is thus interconnected to every other packet switch via these connections.

In this configuration, PAI, for example, 308 in this embodiment, recognizes destination addresses (specific packet community number) associated with its destination packet switch. For example, PAI 308 recognizes the addresses of all endpoints in packet switch 47, including speech processor (SP) 57, by examining the community address field of all packets and matching on community address equal to 47. Therefore, a packet from packet handler (PH) 255 in packet switch 247 addressed to speech processor (SP) 57 in packet switch 47 is placed on packet bus 261. PAI 308 recognizes the community address associated with packet switch 47, accepts the packet, and performs encapsulation and protocol to place the packet on ATM bus 307 to PAI 306. PAI 306 reassembles the packet as needed, places it on packet bus 61, and speech processor 57 then receives the packet.

Figure 5:
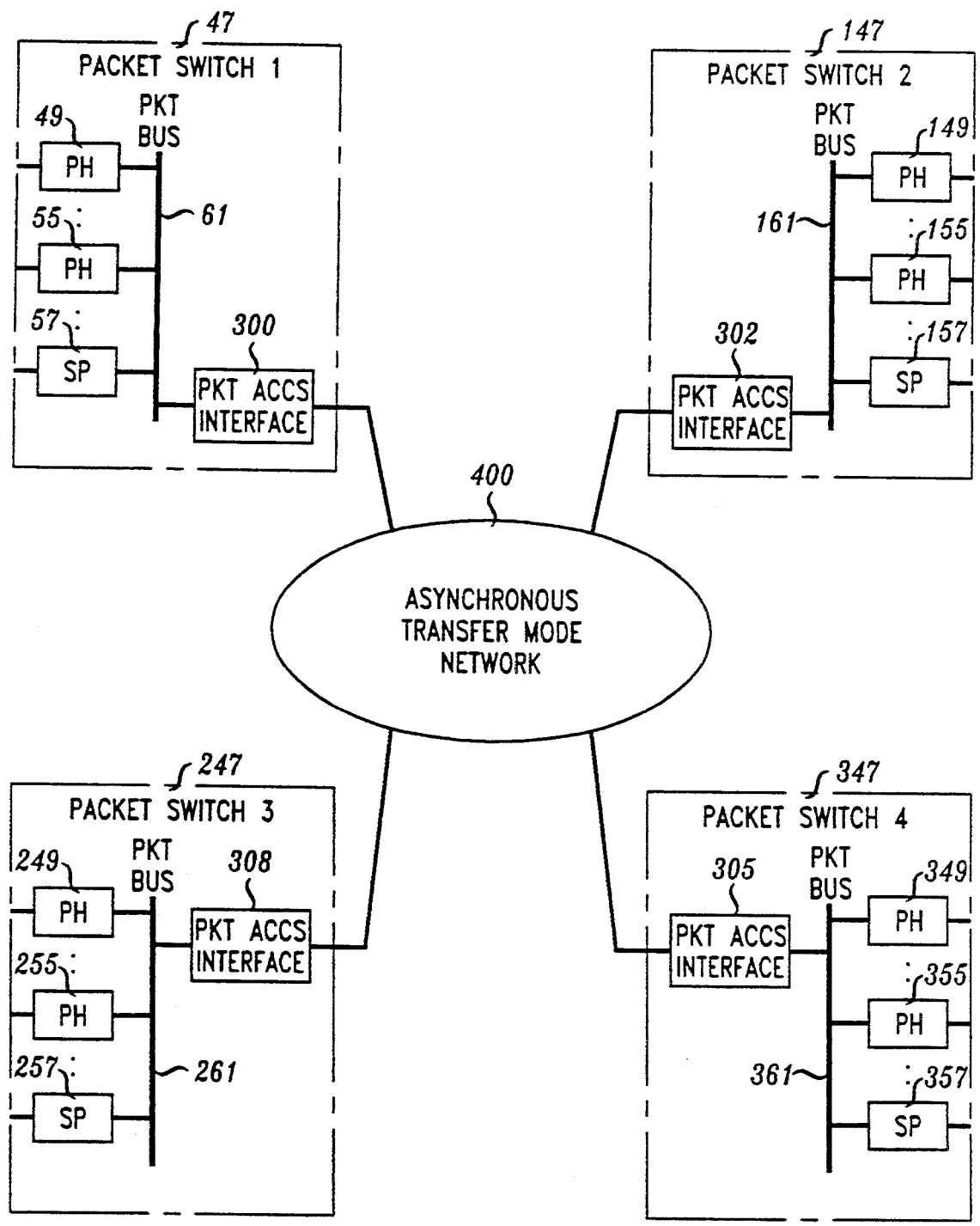
FIG. 5 is a block diagram of a plurality of packet switches connected to a self-routing switch element.

A further embodiment of this invention is presented in FIG. 5, wherein packet switches 47, 147, 247, and 347 are all interconnected via a switch element, which, in this exemplary embodiment is an asynchronous transfer mode (ATM) network 400. In this embodiment, any packet switch can send a message to packet switch 47, through the ATM network 400. A community mismatch system is used in this embodiment. Therefore, if packet handler (PH) 355, for example, in packet switch 347 receives a packet destined for speech processor (SP) 57 in packet switch 47, packet handler 355 puts the message on packet bus 361.

PAI 305 recognizes that packet community number (106 in FIG. 3) is not local to packet switch 347 (i.e., community mismatch routing). The packet is taken by PAI 305 from packet bus 361, PAI 305 encapsulates it with ATM protocol and uses a virtual path or virtual channel indicating the packet is destined for packet switch 47. It sends the ATM cell through the self-routing ATM network 400. ATM network 400 routes the ATM cell to the correct PAI, based on the virtual path or virtual channel number in the ATM cell 110 (FIG. 3). PAI 300 receives a cell or cells that were destined for endpoints on packet bus 61. PAI 300 reassembles them into the original packet 105, and puts them on packet bus 61. Speech processor 57 recognizes its own address in the packet on bus 61 and performs translations as described above. In this manner, any number of packet switches may be connected to the ATM network, and the ATM network is not limited to handling CDMA packet switching, as it may route packets from other applications.

Figure 6:
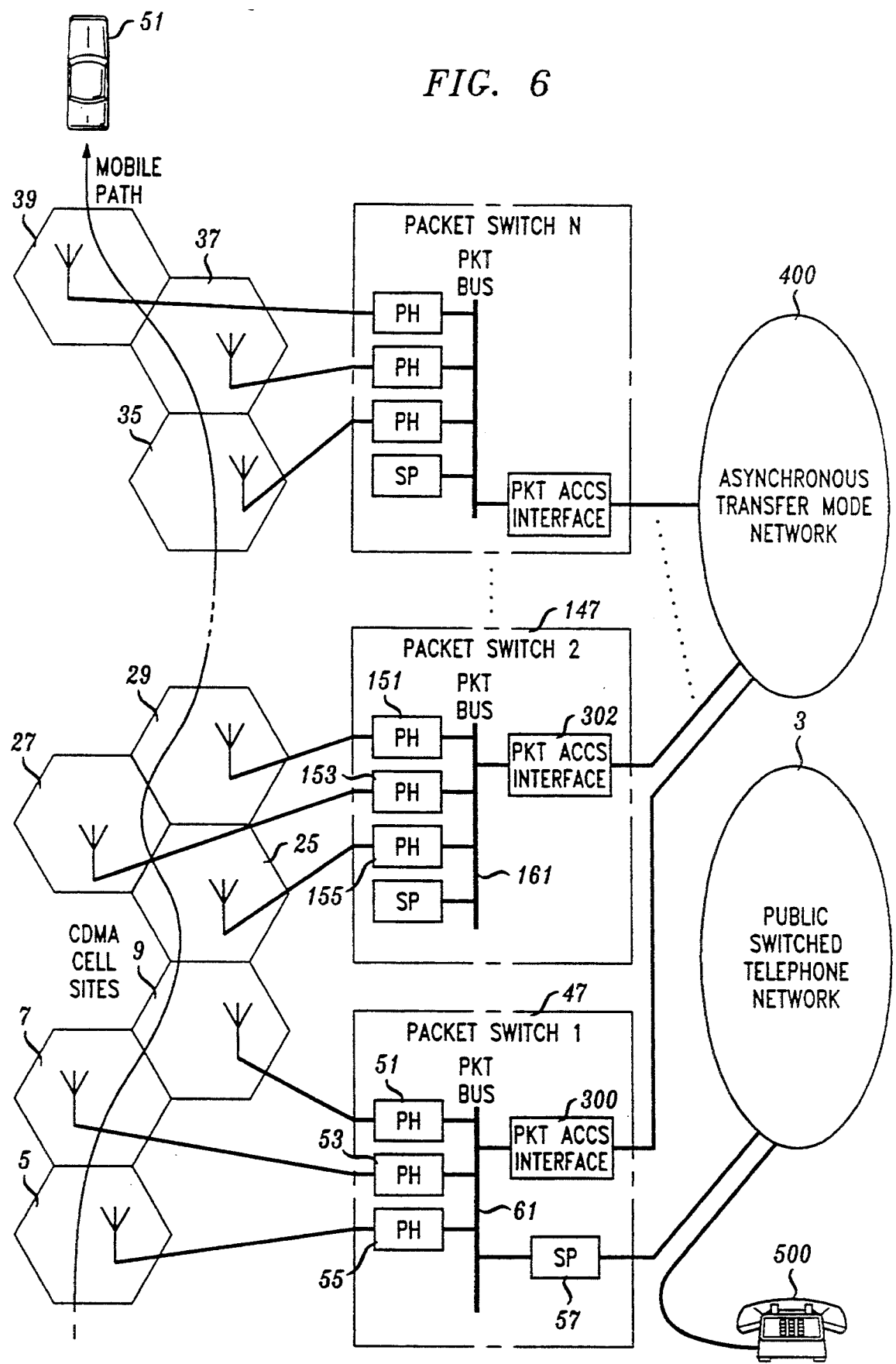
FIG. 6 is an exemplary embodiment of a CDMA mobile telephone communication network wherein a plurality of switches within a metropolitan area are connected to each other via a switch element.

FIG. 6 applies the embodiment of FIG. 5 to wide area packet switching of CDMA mobile telephone communications. In this exemplary embodiment, mobile telephone 51 initiates a call to telephone 500 when it is in cell 5, connected to packet switch 47. Packet handler (PH) 55 receives packets from cell 5 and sends them on bus 61 to speech processor 57 which connects to PSTN 3 and to telephone 500. As mobile 51 moves from cell 5 to cell 7, ECP network (not shown for clarity in this figure, but shown as 29 in FIG. 1) informs cell site 7 of the speech processor (SP) 57 handling the call. As mobile 51 moves into cells 7 and 9, packet handlers 53 and 51, respectively, send packets on bus 61 to speech processor 57. Speech processor 57 continues to be the only connection to PSTN network 3 and telephone 500 for this call.

Mobile 51 then moves from cell 9 into adjoining cell 25, which is serviced by packet handler 155, in packet switch 147. Cell 25 sends packets to packet handler 155, which places them on packet bus 161. PAI 302 recognizes that the address is not for a member of the packet bus 161 community, encapsulates the packets in ATM protocol as described above with a VCI or VPI indicating the destination community, and sends them through self-routing ATM network 400 (switch element). Self-routing ATM network 400 examines the VPI or VCI fields and routes the cells to the appropriate PAI. Cells with VPIs or VCIs destined for packet bus 61 are routed to PAI 300.

Encapsulated packets arrive at PAI 300 in packet switch 47, and are reassembled and put on packet bus 61 to speech processor 57. Similarly, mobile 51 may move through cells 35, 37, 39, and all intervening cells, since all of the packet switches are connected to ATM network 400. Thus, the call from SP 57 through PSTN 3 into telephone 500 does not have to be torn down as mobile 51 crosses cell and switch boundaries. Therefore, no hard handoff ever takes place throughout the entire network of switches connected to ATM network 400. An entire metropolitan area may be connected in this manner with all cellular switches connected to one ATM network. If this network were in metropolitan Chicago, for example, cell 5 could be in Kankakee in the far south, cell 39 could be in Zion in the far north, and mobile 51 could traverse the entire area without encountering a hard handoff.

It is to be understood that the above-described embodiment is merely an illustrative principal of the invention and that many variations may be devised by those skilled in the art without departing from the scope of the invention. It is, therefore, intended that such variations be included within the scope of the claims.

We claim:

1. In a wireless telecommunications network, a system for providing connectionless access for wireless communication between cell sites and the PSTN, said wireless communication using packets in a first format, said network comprising:

a plurality of cell site termination means connected to each of said cell sites for creating and reading packets used in said wireless communication, each of said cell site termination means including means for prepending a destination address on said created packets;

a plurality of PSTN termination means connected to said PSTN, each of said PSTN termination means having means responsive to said destination address for receiving said created packet and translating said packets from said first format into a form used in said PSTN, said PSTN terminating means also having means responsive to receipt of data in a form used in said PSTN for translating said data into packets in said first format and prepending a destination address on said packets indicative of said cell site termination means;

said network being configured such said all translation into and out of said first format for a given wireless call is performed at one PSTN termination means in said network; and packet switching means connected between each said cell site termination means and each said PSTN termination means responsive to said prepended destination addresses for transporting said packets between said cell site termination means and said one PSTN termination means to connect said wireless call to said PSTN, so that said one PSTN termination means remains the same for the duration of said call.

2. The system of claim 1 wherein said form used in said PSTN comprises a 64K bps pulse code modulated stream.

3. A method for relaying CDMA packets between a cell in a cellular telephone system and the public switched telephone network, said method comprising the steps of:

receiving a CDMA packet at a cell site;

transmitting said CDMA packet to a packet switch, said packet switch having a packet bus, a packet handler connected to said packet bus, and a speech processing handler connected to said packet bus;

said packet handler receiving said CDMA packet at said packet switch and moving said packet onto said packet bus;

said speech processor receiving said CDMA packet from said bus, translating said CDMA packet into data usable by said public switched telephone network; and delivering said data to said public switched telephone network.

4. A method for relaying CDMA packets between the public switched telephone network and a cell site, said method comprising the steps of:

receiving data from said public switched telephone network at a packet switch, said packet switch having a packet bus, a packet handler connected to said packet bus, and a speech processor connected to said packet bus;

said speech processor receiving said data from said public switched telephone network, translating said data into CDMA packets and moving said packet onto said packet bus;

said packet handler receiving said CDMA packet from said packet bus; and said packet handler sending said CDMA packet to a cell site.

5. A method for delivering a packet from a wireless cell site to a PSTN interface said wireless cell site and said PSTN interface both being connected to a packet switch, said method comprising the steps of:

packetizing data representing the communication of a call at said cell site into a plurality of packets;

prepending a destination address of said PSTN interface to each of said packets;

sending said packets on said packet switch; and said PSTN interface recognizing its own destination address in said packets on said packet switch and taking said packets from said packet switch, said PSTN interface translating said packetized data representing the communication of said call into a form expected by said PSTN.

6. In a wireless telecommunication system, said wireless telecommunication system comprising a plurality of cells, a method for achieving a soft handoff when a mobile station moves from one cell into another, said method comprising the steps of:

packetizing data representing the communication of a call at a first one of said plurality of cells, and prepending a destination address of a PSTN interface to each of said packets from said first cell; p1 packetizing data representing the communication of a call at a second one of said plurality of cells, and prepending said destination address of said PSTN interface to each of said packets from said second cell, wherein said packets from said second cell and said packets from said first cell comprise identical data;

sending said packets from said first and second cells on a packet switch;

said PSTN interface recognizing its own address in said packets from said first and second cells and removing said packets from said packet switch;

said PSTN interface choosing one of said packets from said first and said second cell; and said PSTN interface translating said chosen packet into a form switchable by said switching network.

7. The method of claim 6 wherein said step of translating comprises translating said chosen packet into a 64K bps pulse code modulated stream.

8. The method of claim 6 wherein said steps of packetizing data at said first and second cell sites includes adding an indication of signal strength to said packets; and said step of choosing one of said packets comprises comparing said signal strength indications in said packets and selecting the stronger signal.

* * * * *

UNITED STATES PATENT AND TRADEMARK OFFICE
CERTIFICATE OF CORRECTION

PATENT NO: 5,438,565
ISSUED: August 1, 1995
INVENTOR(s): Jayant G. Hemmady, Craig P.
Reilly, Neil J. Romy, Ronald A. Spanke,
Douglas H. Yano It is certified that error appears in the above-indentified patent and that said Letters Patent is hereby corrected as shown below:

Column 9, Claim 1, line 42; "terminating" should be "termination";

Column 10, Claim 6, line 54; "p1" at end of line should be deleted;

Column 11, Claim 6, before line 1; the
following text is missing:

"said PSTN interface choosing one of said packets from said first and said second cell; and"

Signed and Sealed this

Nineteenth Day of March, 1996

Attest:

BRUCE LEHMAN

Attesting Officer     Commissioner of Patents and Trademarks